United States Patent
Hagenbuch

(10) Patent No.: US 9,434,231 B2
(45) Date of Patent: Sep. 6, 2016

(54) OIL SANDS TRUCK BODY

(71) Applicant: LeRoy G. Hagenbuch, Peoria Heights, IL (US)

(72) Inventor: LeRoy G. Hagenbuch, Peoria Heights, IL (US)

(*) Notice: Subject to any disclaimer, the term of this patent is extended or adjusted under 35 U.S.C. 154(b) by 0 days.

(21) Appl. No.: 14/181,151

(22) Filed: Feb. 14, 2014

(65) Prior Publication Data
US 2014/0159465 A1 Jun. 12, 2014

Related U.S. Application Data

(63) Continuation-in-part of application No. 13/397,663, filed on Feb. 15, 2012, now Pat. No. 8,651,580, and a continuation-in-part of application No. 13/397,657, filed on Feb. 15, 2012, now Pat. No. 8,690,259.

(60) Provisional application No. 61/560,901, filed on Nov. 17, 2011, provisional application No. 61/443,158, filed on Feb. 15, 2011.

(51) Int. Cl.
| | |
|---|---|
| *B60P 1/16* | (2006.01) |
| *B60H 1/00* | (2006.01) |
| *B60P 1/28* | (2006.01) |
| *B60K 13/06* | (2006.01) |
| *B60P 1/60* | (2006.01) |

(52) U.S. Cl.
CPC .......... *B60H 1/00014* (2013.01); *B60K 13/06* (2013.01); *B60P 1/286* (2013.01); *B60P 1/60* (2013.01)

(58) Field of Classification Search
CPC ............. B60P 1/28; B60P 1/286; B60P 1/60; B60H 1/00014; B60K 13/06
USPC ....... 298/1 H, 1 B, 1 V, 7, 17 R, 22 R, 23 R, 298/23 DF; 296/183.2
See application file for complete search history.

(56) References Cited

U.S. PATENT DOCUMENTS

| | | | |
|---|---|---|---|
| 2,756,000 | A | 7/1956 | Anderson |
| 3,331,433 | A | 7/1967 | Hagerge |
| 3,480,321 | A | 11/1969 | Brandt et al. |
| 3,499,678 | A | 3/1970 | Richler |
| 4,826,233 | A | 5/1989 | Hagenbuch |

(Continued)

OTHER PUBLICATIONS

Chromium Corporation—Crodon Wear Plate, "Installation/Studding/Bolting/Welding Guidelines", retrieved from http://www.chromcorp.com/crodon/installation.cfmp[Feb. 24, 2012 3:30:41PM] (7 pages).

(Continued)

*Primary Examiner* — Stephen Gordon
(74) *Attorney, Agent, or Firm* — Leydig, Voit & Mayer, Ltd.

(57) ABSTRACT

A truck body that efficiently hauls homogeneous and cohesive materials that typically coagulate and adhere together in one consolidated mass. The adhesion of this consolidated mass to the surface of the truck body is minimized and the build up of "carryback" is effectively prevented during haul cycles. Hauled amalgamated materials are dumped from the truck body such that the amalgamation breaks up and is safely dumped. One typical material that displays such a coagulated conglomerate massing is "oil sands" from which oil is extracted. The body design encourages the material to break up as it is dumped by using outwardly tapered walls and a non-linear edge from which the loaded material falls.

13 Claims, 15 Drawing Sheets

(56) References Cited

U.S. PATENT DOCUMENTS

| | | |
|---|---|---|
| 5,460,431 A | 10/1995 | McWilliams |
| 5,555,699 A | 9/1996 | Borthick et al. |
| 5,622,311 A | 4/1997 | Huston et al. |
| 1,627,336 A | 5/1997 | Nelson |
| 5,662,374 A | 9/1997 | Wheeler |
| 5,851,043 A | 12/1998 | Moutrey et al. |
| 6,022,068 A | 2/2000 | D'Amico |
| 6,174,014 B1 | 1/2001 | Hook et al. |
| 6,565,146 B2 * | 5/2003 | Fujan et al. |
| 6,637,808 B1 | 10/2003 | Ling et al. |
| 6,854,808 B2 | 2/2005 | Kostecki |
| 7,320,504 B2 | 1/2008 | Colling |
| 7,369,978 B1 | 5/2008 | Hagenbuch et al. |
| 7,743,604 B1 | 6/2010 | Albanesi |
| 7,901,009 B2 | 3/2011 | Hagenbuch |
| 8,651,580 B2 * | 2/2014 | Hagenbuch ............... 298/1 H |
| 8,690,259 B2 * | 4/2014 | Hagenbuch ............... 298/1 H |
| 2004/0020003 A1 | 2/2004 | Strauser |
| 2005/0060834 A1 | 3/2005 | Strauser |
| 2005/0145624 A1 | 7/2005 | Minegar |
| 2007/0069569 A1 | 3/2007 | D'Amico et al. |
| 2008/0067856 A1 | 3/2008 | Hagenbuch |
| 2009/0038503 A1 | 2/2009 | Bymaster et al. |
| 2009/0152934 A1 | 6/2009 | Devries et al. |
| 2010/0316842 A1 * | 12/2010 | Tuteja et al. |

OTHER PUBLICATIONS

The Crodon Chronicles, Helpful Tips for Using CRODON® Wear Plate, retrieved from http://www.chromcorp.com/crodon/installation.cfmp[Feb. 24, 2012 3:30:41PM] (2 pages).

International Search Report and Written Opinion from co-pending International Application No. PCT/US2012/25318.

International Search Report and Written Opinion from co-pending International Application No. PCT/US2012/25319.

Examination Report No. 1, dated May 15, 2015 for co-pending Australian Application No. 2013216662.

Examination Report No. 2, dated May 20, 2015 for co-pending Australian Application No. 2013216662.

* cited by examiner

OIL SANDS TRUCK BODY

CROSS-REFERENCE TO RELATED APPLICATIONS

This patent application is a Continuation-in-part of U.S. application Ser. No. 13/397,657, filed Feb. 15, 2012, issued as U.S. Pat. No. 8,690,259, and is a Continuation-in-part of U.S. application Ser. No. 13/397,663, filed Feb. 15, 2012, issued as U.S. Pat. No. 8,651,580, each of which claims the benefit of U.S. Provisional Patent Application No. 61/443,158, filed Feb. 15, 2011, and U.S. Provisional Patent Application No. 61/560,901, filed Nov. 17, 2011, which are incorporated by reference herein in their entireties.

TECHNICAL FIELD OF THE INVENTION

The invention relates to a container for hauling materials that have a tendency to coagulate and adhere together in a semi solid mass as well as cling to the container hauling them. The invention more particularly relates to containers that are truck bodies and specifically truck bodies that pivot to dump their loads. The invention is particularly successful hauling and dumping materials such as oil sands and clay type overburden materials or cover material.

BACKGROUND OF THE INVENTION

Today, off-highway trucks are used to mine many minerals for further refining and clay type overburden or cover materials. The mining of various types of materials is relatively straightforward, although the complexity of the mining is increased by 1) the natural cohesive characteristics of many materials, 2) the amount of material being mined/hauled and 3) the environmental conditions under which it is mined.

In their natural state, many mined materials are extremely sticky and these mined materials naturally freely cling to each other. For example, the composition of oil sands, oil sands overburden and oil sands cover material is, by its very nature, extremely oil and sticky. The specific composition of oil sands is: 1) a grain of sand, 2) surrounded by or encapsulated by moisture/water, and 3) oil which encapsulates and surrounds both the grain of sand and the water. The surrounding oil of each grain causes the oil sands to cling to each other and surfaces the oil sands contact. The sticky nature of certain materials, such as oil sands, The sticky nature of certain materials, such as oil sands, can result in a buildup of material on the truck body surfaces, etc. that contact such materials. For example, walking around on some materials will quickly result in the soles of a person's shoes building up with layers of material that can easily buildup to 8 to 10 mm thick.

This same sort of buildup happens in truck bodies. A common condition that occurs during the use of truck bodies is the buildup of "carryback." As successive loads are hauled, sticky hauled material begins to incrementally buildup in the interior of the body with each load until the body retains a significant amount of material between successive loads. Experience has shown that initial load carryback begins in those areas of a truck body where intersecting walls of a truck body meet.

This build up of material or "carryback" is significant for very sticky materials. The characteristics of materials which stick together and coagulate are exacerbated as material in its natural state is disturbed by the mining process. With these sorts of materials, the buildup of carryback happens quickly and is significant. This significant carryback reduces the effective capacity of the truck body and reduces the efficiency of the truck and the overall mining operation.

Mine loading shovels weigh in at 1450 to 1800 tons and off-highway trucks weigh in at 550 to 600 tons. As loading shovel buckets dig into the materials being mined and load or "drop" 100 tons at a time of material into off-highway truck bodies, the materials are further compressed in the off-highway truck body. Also, as material is hauled in an off-highway truck body the material is further compacted as off-highway trucks navigate the mine haul roads to their destination, vibrating the load, causing settling of the load in the off-highway truck body. By the time an off-highway truck reaches its destination, in some cases the shaking and resulting settling of the hauled load results in the hauled materials amalgamating into almost a solid packed mass.

The circumstances of mining and hauling, in combination with the cohesive coagulating characteristics of some hauled materials, can result in the hauled materials dumping from the truck body as a solid mass or "loaf." As loads of material "loafs" exit truck bodies, the truck chassis itself is subjected to extreme 'jolts,' resulting in severe truck driver discomfort. Drivers of trucks hauling materials which "loaf" are often exposed to extreme 'whole body vibration' as loads of "loafs" are dumped.

The average individual is unlikely to appreciate the impact that the problems associated with mining and hauling cohesive materials has, as most individuals are unaware of the amount of cohesive materials that are being mined. Considering only the example of oil sands, the shear amount of this material being mined today is almost beyond comprehension for the average individual. Today, about every two (2) tons of oil sands mined produces about one (1) barrel of oil. Current production of oil from surface mining operations in the Northern Alberta Region of Canada, alone, is about 750,000 barrels of oil a day, which translates to the daily mining of one and a half million tons of oil-producing oil sands. This number does not include any oil sands overburden or cover materials that must also be mined to expose the oil sands.

By comparison, the Hoover Dam spanning the Colorado River required 3,250,000 cu. yards (2.6 million cu. m.) of concrete, which has been compared to the amount of concrete in a 16-ft. wide (4.9 m) highway between Pensacola, Fla., and Seattle, Wash. Putting this into perspective, enough oil bearing sands material is mined/hauled today to recreate a new Hoover Dam about every four days. Mining oils sands is a massive endeavor.

The environmental conditions for mining oil sands are extremely challenging. Today, the bulk of oil sands mining occurs in Northern Alberta, Canada. In this region of the world, temperatures in the winter months can get very cold, approaching minus 40 degrees Celsius (about −40° Fahrenheit). But in the summer months, temperatures often exceed 35 degrees Celsius (+95° Fahrenheit), resulting in the oils sands having a semi-fluid, sticky and goby consistency. Although the oil sands are very oily in composition, as they are mined, they tend to re-solidify in a truck body to a very firm single mass ("loaf"), which invariably may tend to stick to the inner surface of the truck body. In either climate, though, as loads of oil sands material are dumped from a truck body, an oils sands 'loaf' is created. And, yet a clean release of the material from the inner surface of a truck body can be problematic. Transporting oil sands material is virtually unknown outside the localized mining of oil sands.

SUMMARY OF THE INVENTION

An aspect of the present invention is to provide an apparatus to efficiently and effectively haul, in a truck body, cohesive materials, whether the material is being mined for later processing or is overburden or covering materials. Through the use of certain materials for constructing the truck body in combination with the truck body design, a truck body is created that both alleviates the problem of cohesive materials sticking to the truck body and facilitates the breaking down of the material "mass" or "loaf" as it is dumped from the truck body. Embodiments of the invention are particularly suited for use with oil sands.

A hydrophobic and/or oleophobic material, selectively placed on the interior surfaces of the truck body, combined with body sidewalls receding from the center of the truck body and a body floor line receding from the center of the body floor to the sides of the body floor minimizes the sticking in the truck body of hauled materials and overburden or cover materials. This truck body construction significantly improves the natural material flow from the truck body as it is pivoted to a dump position. Material flows away from the corners and sidewalls of the truck body where "carryback" normally begins. Thus, there is no buildup of a residue of material to create "carryback." To this end, hydrophobic and/or oleophobic material lines the interior of the body at strategic locations. The body sidewalls are outwardly tapered from front to back at relatively severe angles to help break down the load loaf as it is dumped from the body.

In an embodiment of the truck body, the body sidewalls are narrower at the front of the truck body and substantially wider at the rear of the truck body. In fact the body sidewalls at the rear of the truck body may be 10 to 20 percent wider than the body sidewalls at the front of the truck body. At the rear of a truck body constructed in accordance with one embodiment, the sidewalls are 12 to 15 percent wider than at the front of the truck body. These outwardly tapering truck body sidewalls complemented by hydrophobic/oleophobic, material bridging the body sidewalls, body front wall and body floor insure the non-stick flowing of material out of a truck body when the truck body is in its dump position.

In one embodiment, steel plates coated with a non-stick, hydrophobic and/or oleophobic material bridge the body intersecting planes, where typical material "carryback" historically begins to accumulate. The material releasing properties of this non-stick material combined with the tapering body sidewalls receding from the load as it flows from the body insure minimal load material retention.

The outward tapering body sidewalls cause the sides of the hauled load to lose support from the sidewalls as the load is dumped from the body, which encourages the hauled material load to slough off and break down as it is dumped.

In a further embodiment, the truck body floor can be severely raked forwards towards the outsides of the body floor, which in combination with outwardly tapering truck body sidewalls, facilitates a coagulated material "loaf" mass release and the breaking down of the coagulated material "loaf" as it is dumped. In conventional truck bodies, the end of the floor at the back of the body is squared off with respect to the sidewalls. By angling or raking forward the edge of the floor from a center point to the sidewalls, as material is dumped the material nearest the sidewalls is free of the floor before the material toward the center clears the floor, which causes the material closest to the sidewalls to fall away before neighboring material located closer to the center of the floor. These dynamics result in the loafing characteristics of the hauled material loaf breaking down as the truck body is dumped.

BRIEF DESCRIPTION OF THE DRAWINGS

Exemplary embodiments of the present invention are described in more detail below, with reference to the drawings, in which.

DETAILED DESCRIPTION OF PREFERRED EMBODIMENTS

FIGS. 1-15 illustrate embodiments of a truck body that can efficiently and effectively haul cohesive materials, in particular oil sands. The illustrated truck bodies include a number of features that allow the loads being hauled to be dispensed completely and to break down the load mass as the truck body is dumped. These features include a non-stick surface bridging one or more of the intersections between the front wall, floor and sidewalls of the truck body. To enhance the effectiveness of the non-stick surfaces, at least a portion of these surfaces may be heated by an exhaust manifold winding through or around the truck body. The sidewalls of the truck body also taper outward from the front wall of the truck body toward the rear. Therefore, as the load moves toward the rear body opening as the truck body is dumped, the load is less likely to stick to the body sidewalls. Moreover, as the load is dumped, the body sidewalls begin to widen with respect to the sides of the load as it moves toward the rear body opening. As a result, the sides of the load are no longer supported by the body sidewalls and the sides of the load will begin to break down as the load moves toward the rear body opening. This initial breaking down at the sides of the load further promotes the complete breaking down of the load, preventing the load from dumping as a compact loaf. Another feature that promotes the breaking up of the load is a variation in the length of the truck body floor across the width of the truck body. When the sides of the truck body floor are shorter than the center, the corners of the load will fall away before the load center reaches the center rear end of the truck body floor. This breaking down at the corners of the load further promotes overall breaking down of the load and prevents the load from dispensing as a loaf when the truck body is dumped.

Figure 1:
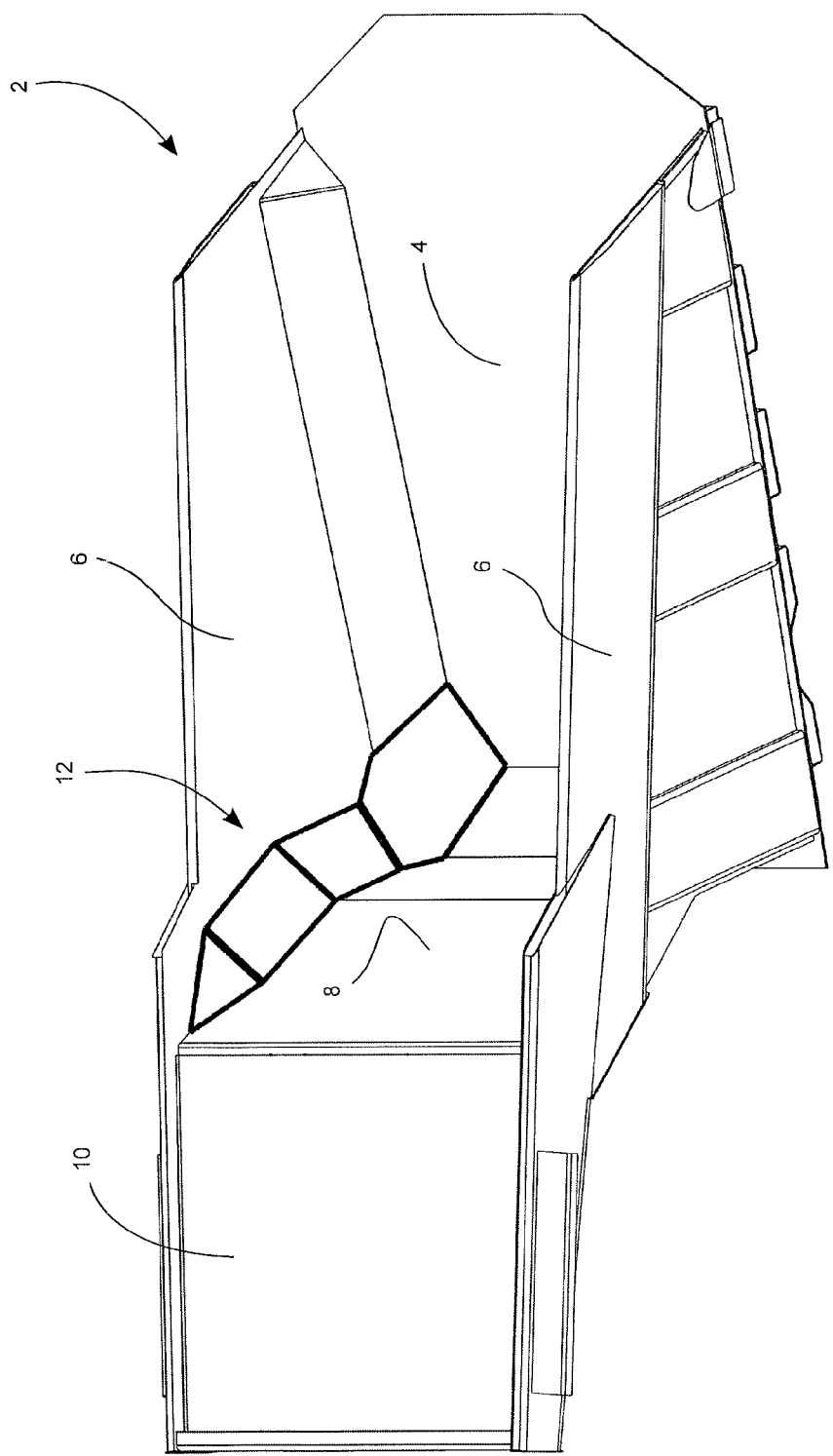
FIG. 1 is an elevated side view of a truck body including a non-stick surface bridging an intersection between the body floor, body front wall and body sidewall.
Figure 2:
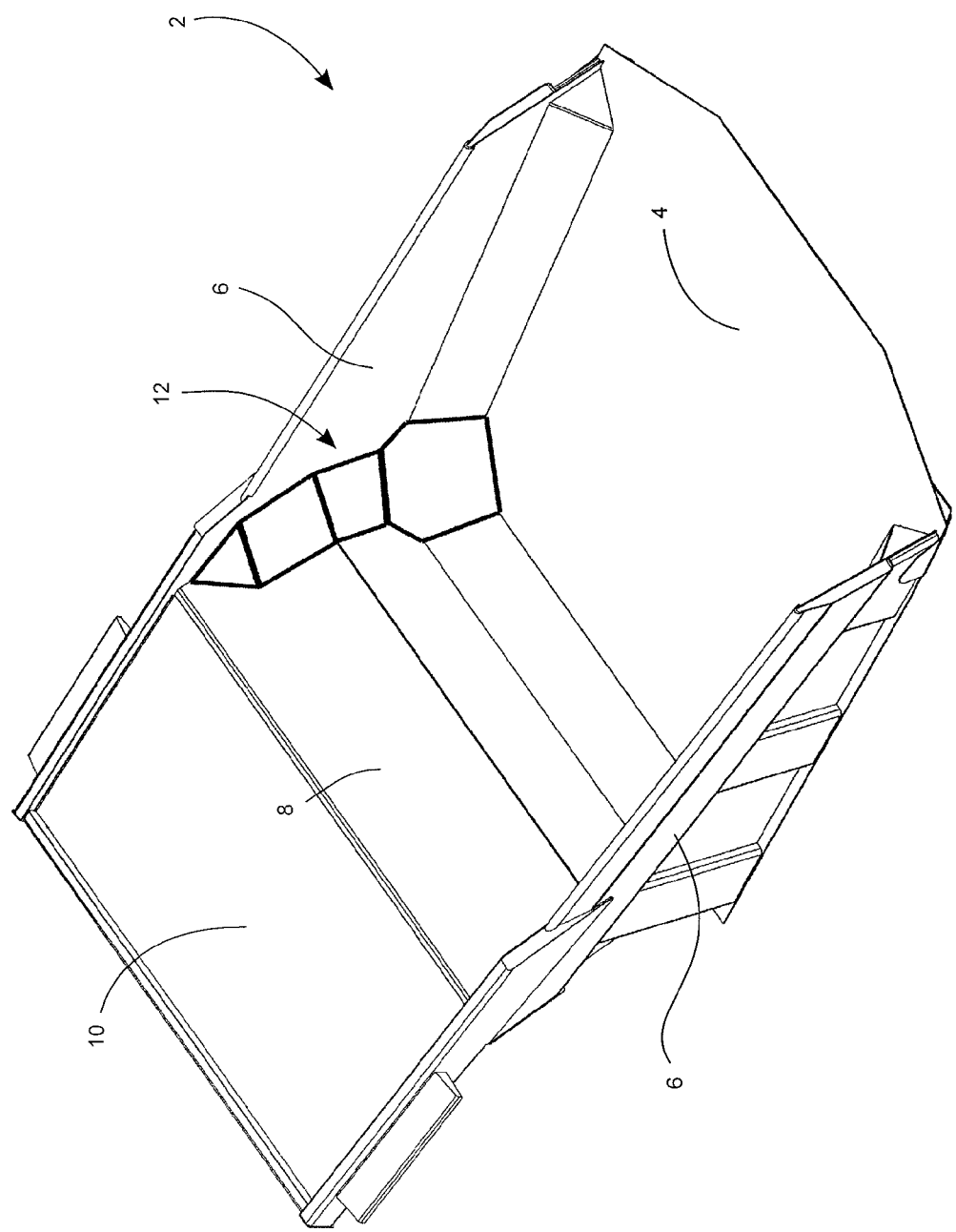
FIG. 2 is an isometric view of the truck body of FIG. 1.
Figure 15:
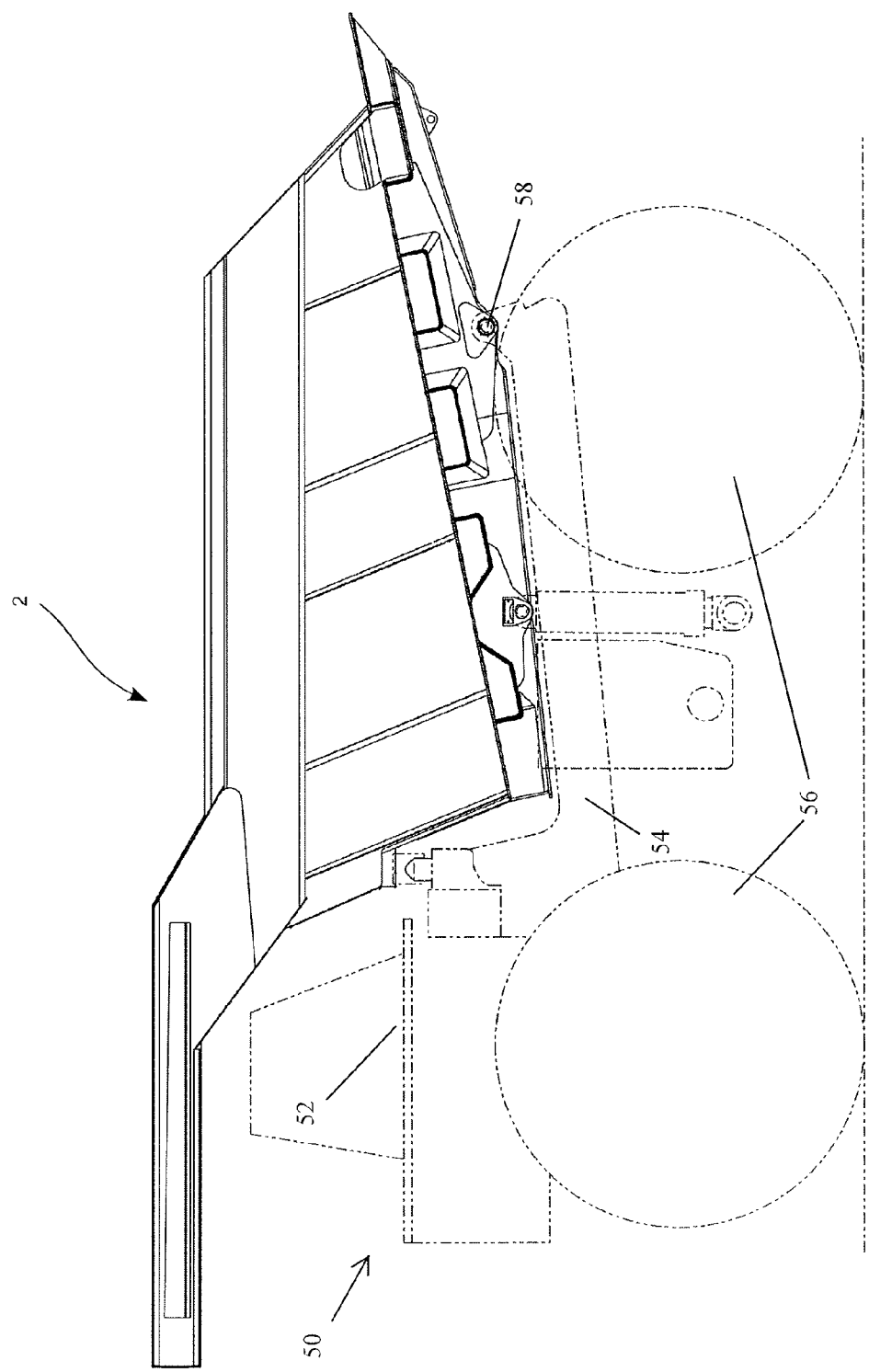
FIG. 15 is a side view of a truck body positioned on an off-highway truck.

Referring to FIGS. 1 and 2, a truck body 2 includes a body floor 4, two sidewalls 6 and a front wall 8. A canopy 10 extends forward from the top of the truck body front wall 8 and is configured to cover the front of the corresponding truck chassis, particularly the cab, as shown in FIG. 15. The truck body 2 includes a non-stick surface 12 bridging the intersection of the truck body floor 4, one of the truck body sidewalls 6 and the front wall 8 of the truck body. It should be understood that the intersection of the floor 4, front wall 8 and opposite sidewall 6 is also bridged by a mirror-image non-stick surface 12. In this context, the term bridging is used to indicate that the non-stick surface extends from one of the truck body components (i.e., floor, sidewall or front wall) to another. This can be achieved by one or more distinct plates with a non-stick material that extends across the intersection and abuts each of the corresponding truck body components, as shown in the FIGS. 1 and 2, or it can be achieved by a surface section of the truck body components, near the intersection, being covered with a non-stick material. The use of distinct plates having a non-stick surface may be advantageous because the distinct plates can cover the intersection between the truck body components, and thus avoid the geometry of a sharp edge between two components or a distinct corner between all three components. This is advantageous because sharp edges and corners are more likely to capture material being hauled and provide a starting point for "carryback."

The term non-stick surface is used herein to encompass hydrophobic surfaces and/or oleophobic surfaces. The term hydrophobic refers to any surface, such as treated steel or a painted surface, on which water beads are formed when water contacts the surface. A hydrophobic surface is exemplified by poor wetting, poor adhesiveness and having a 'low' free surface energy/adhesion. Relative terms are used to indicate the degree of hydrophobicity of a material or surface, where surfaces with water contact angles greater than 90° are called hydrophobic while surfaces with water contact angles greater than 150° are called super-hydrophobic. Just as water is repelled by hydrophobic materials, so can oil and petroleum products be repelled by oleophobic and super-oleophobic materials or surfaces. The non-stick surface described herein can be hydrophobic, super-hydrophobic, oleophobic, super-oleophobic or any combination thereof. Various different constructions can be used to make the hydrophobic or oleophobic non-stick surface. For example, prefabricated hydrophobic plates, such as CRODON® steel plates manufactured by Chromium Corporation of Dallas, Tex., can form the non-stick surface, which is then attached to the existing components of the truck body 2. Alternatively, coatings can be applied to the truck body components.

Figure 3:
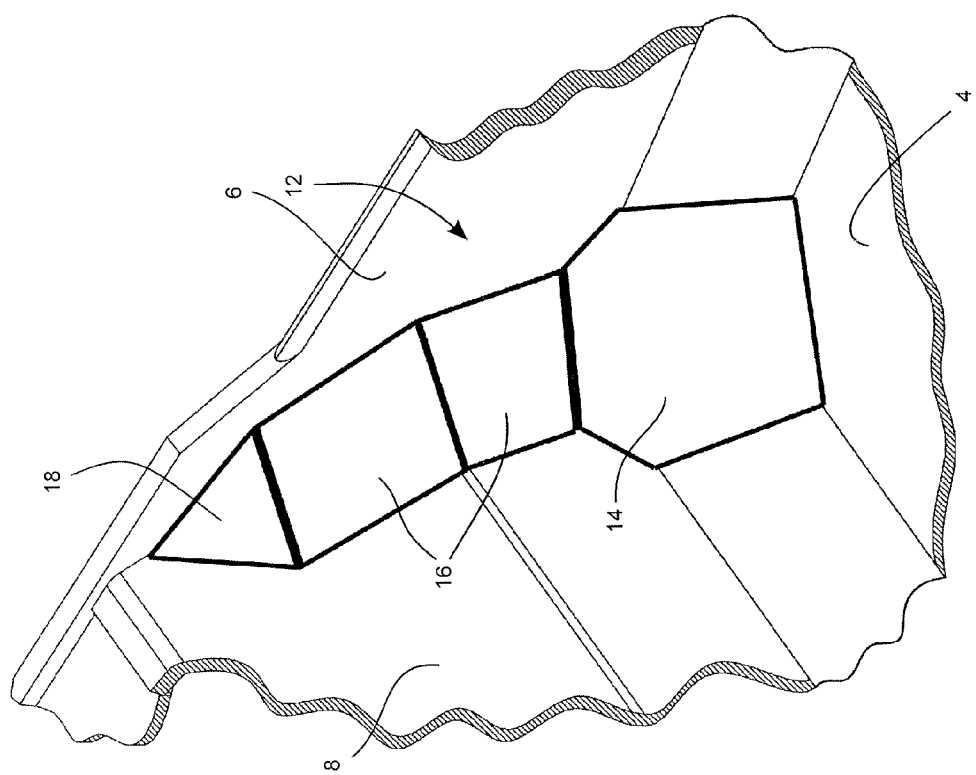
FIG. 3 shows a section of the truck body of FIG. 1.

The enlarged view of FIG. 3 shows a non-stick surface 12 that is formed by a plurality of non-stick plates, including a corner plate 14, two edge plates 16 and an end plate 18. The corner plate 14 bridges three components of the truck body including the floor 4, the sidewall 6 and the front wall 8. The edge plates 16 are disposed above the corner plate 14 and bridge the intersection of the sidewall 6 and the front wall 8 of the truck body 2. At the top of the non-stick surface 12, the end plate 18 also bridges the intersection of the sidewall 6 and the front wall 8. Each of the plates 14, 16, 18 can abut the neighboring plate such that, in combination, the non-stick plates form a continuous non-stick surface 12.

As set forth above, the distinct plates are advantageous because they can traverse the sharp corners and edges formed by the intersections of the truck body floor, sidewalls and front wall. This is particularly the case if the non-stick plates contact the respective adjacent component of the truck body at an angle. As an example, the upper edge plate 16 show in FIG. 3 contacts each of the sidewall 6 and truck body front wall 8 at an approximate angle of around 30° to 45°. Disposing the individual plates 14, 16, 18 at an angle to the truck body components can also provide an additional advantage in that interior space 20 (see FIG. 4) may be formed behind the non-stick surface. As explained in more detail below, this interior space can be used as part of an exhaust manifold for warming the non-stick surface 12. The space 20 is enclosed toward the top of the truck body by the end plate 18.

Figure 4:
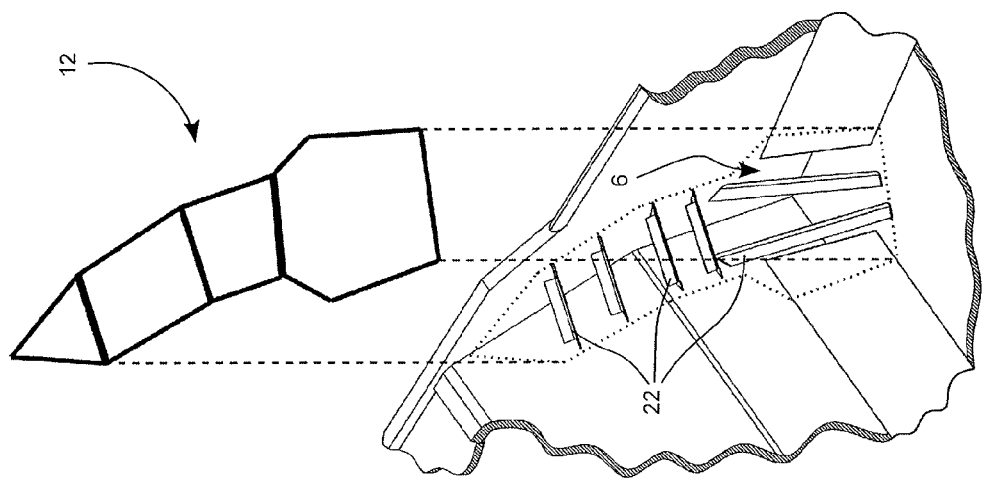
FIG. 4 is an exploded view of a section of the truck body of FIG. 1.
Figure 5:
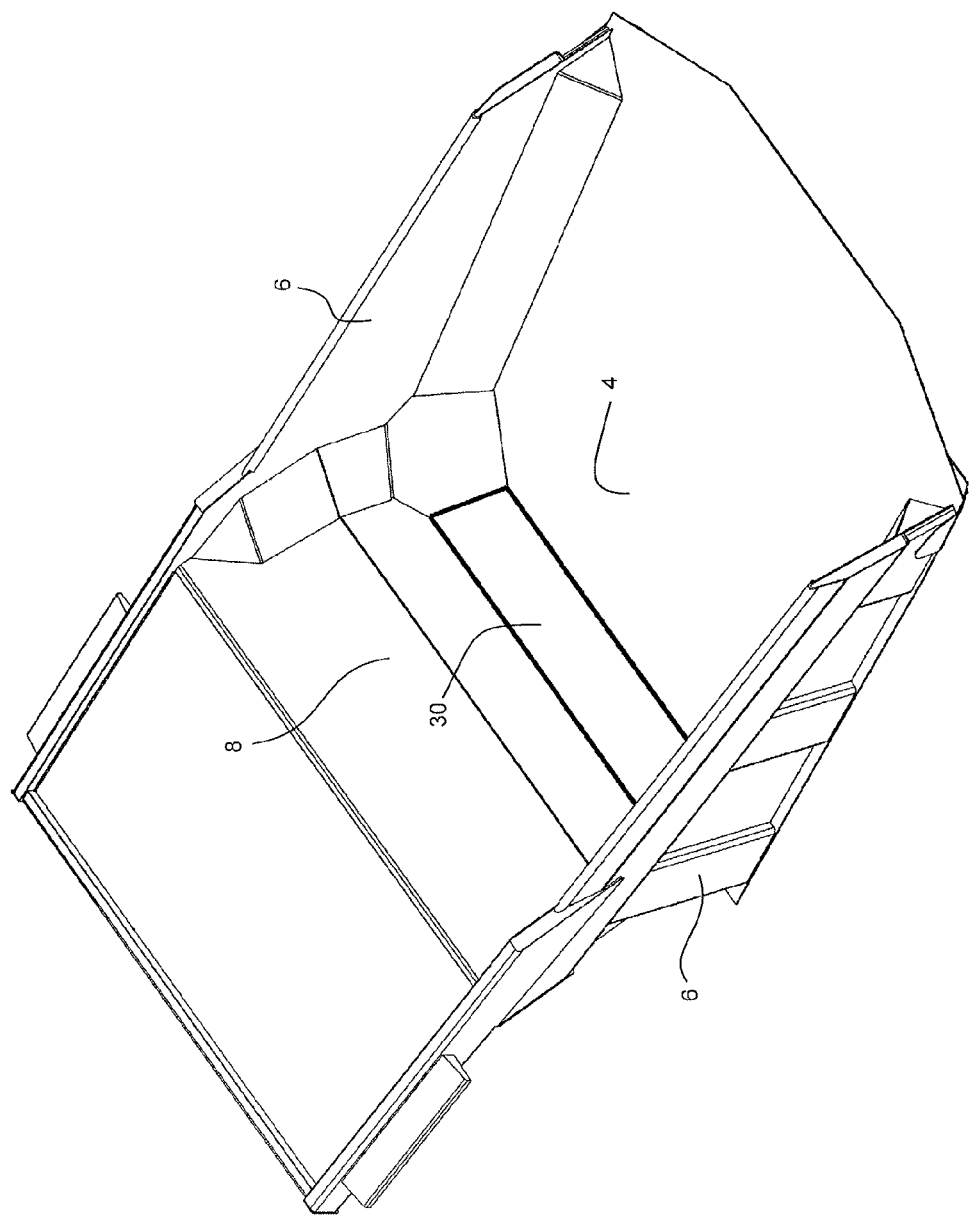
FIG. 5 is an isometric view of another truck body and illustrates another non-stick surface bridging an intersection between the body floor and body front wall.

FIG. 4 shows an exploded view with the non-stick surface 12 removed from the remainder of the truck body 2. As illustrated, the non-stick surface 12 is mounted on structural supports 22 attached to the floor 4, sidewall 6 and/or front wall 8 of the truck body 2. The structural supports 22 are advantageous and may be necessary when the loads being hauled are particularly large, such as with off-highway trucks hauling loads which may be over 100 tons more or less. The edges of the non-stick surface 12 can also be attached to the underlying component of the truck body, for example by welding. For smaller trucks with lighter loads, connection of the edges of the plates of the non-stick surface 12 may be all that is needed to mount the non-stick surface 12 on the truck body 2.

Figure 6:
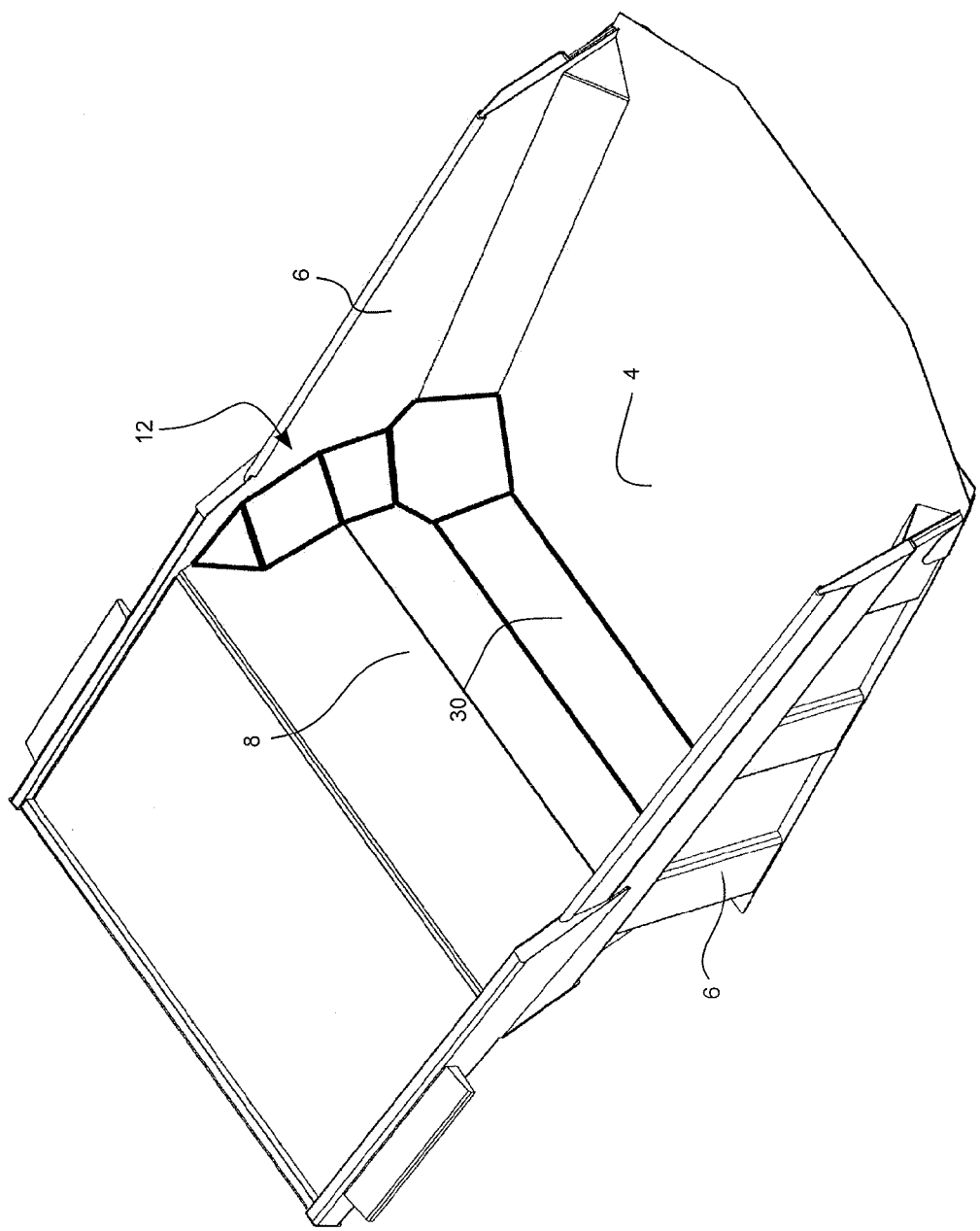
FIG. 6 shows all of the non-stick surfaces of the truck body of FIG. 5.
Figure 7:
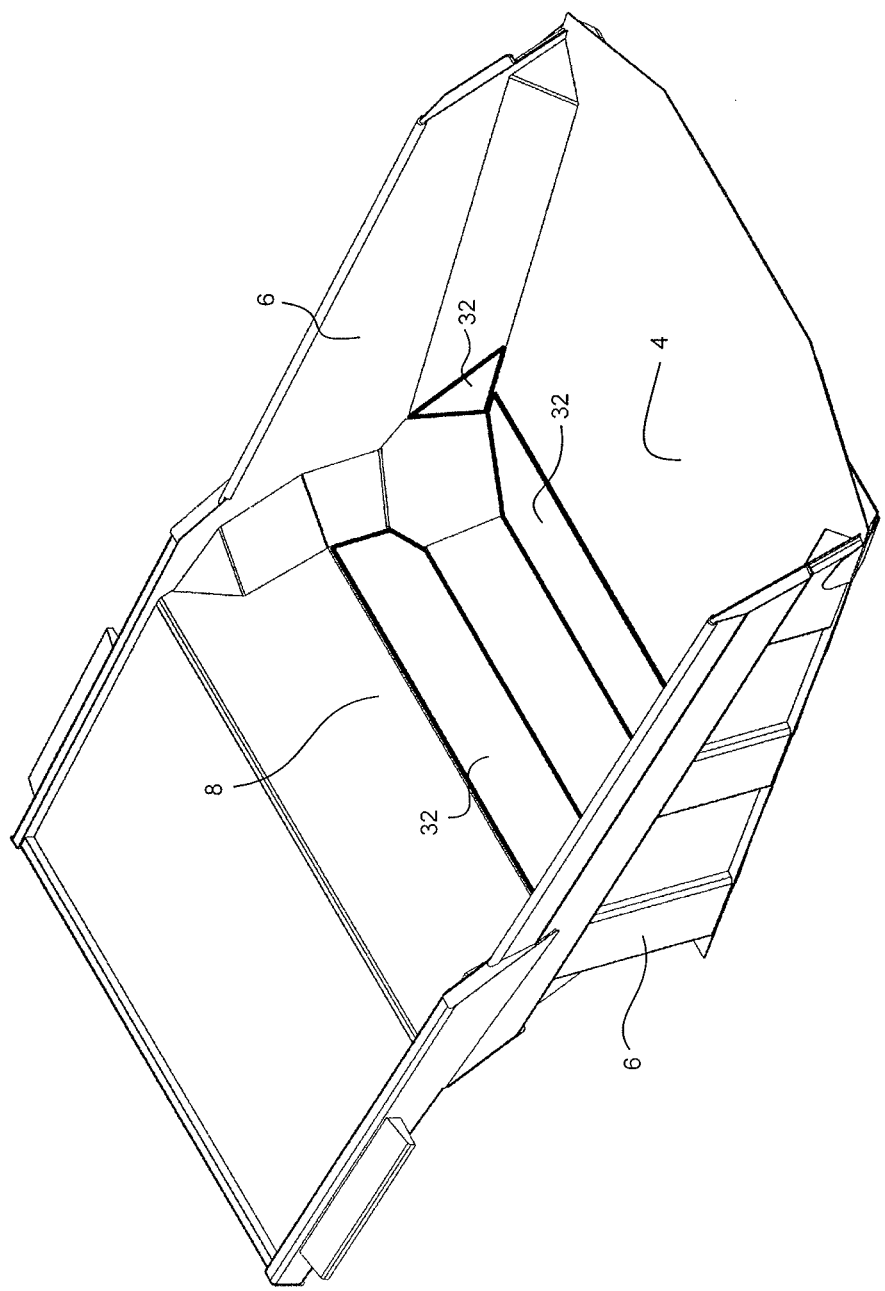
FIG. 7 is an isometric view of a truck body illustrating additional non-stick surfaces along the body floor, body front wall and body side wall.

Depending on the cohesiveness of the load being hauled, it may be advantageous to increase the area of the truck body that is covered by a non-stick surface. Accordingly an additional non-stick surface 30, as shown by the dark-outlined sections of FIG. 5, can be added to the body bridging the truck body floor 4 and truck body front wall 8. Again, this additional non-stick surface 30 can be formed by a non-stick plate that is attached to the truck body components, or it can be formed by covering the appropriate area of the truck body with a hydrophobic/oleophobic coating. FIG. 6 illustrates the entire area of the truck body 2 that is covered with a non-stick surface, in dark outline, by using non-stick surface 12 and additional non-stick surface 30. As shown, these non-stick surfaces 12 and 30 cover the corners at the front of the truck body as well as the intersections between the truck body front wall 8, sidewalls 6, and floor 4.

If desired, the size of the non-stick area can be determined empirically. This can be very advantageous because the tendency for material to stick to the surface of the truck body can depend largely on the specific characteristics of the material being hauled and environmental factors, such as the temperature, where the truck body is being used. Thus, the size of the non-stick area of the truck body that is needed can vary from one work site to another. In order to determine the size of the non-stick area necessary to avoid carryback, a truck body can be outfitted with non-stick surfaces 12 that are located in the corner and vertical intersections of the truck body 2. If it is found that a larger non-stick area is needed, the additional non-stick surface 30 can be added to the truck body, as in FIGS. 5 and 6. If, after inclusion of the additional non-stick surface 30, the load is still adhering to parts of the truck body interior, the size of the non-stick area can be increased again by adding extended non-stick surfaces 32, as shown by the dark outlined sections in FIG. 7.

Figure 8:
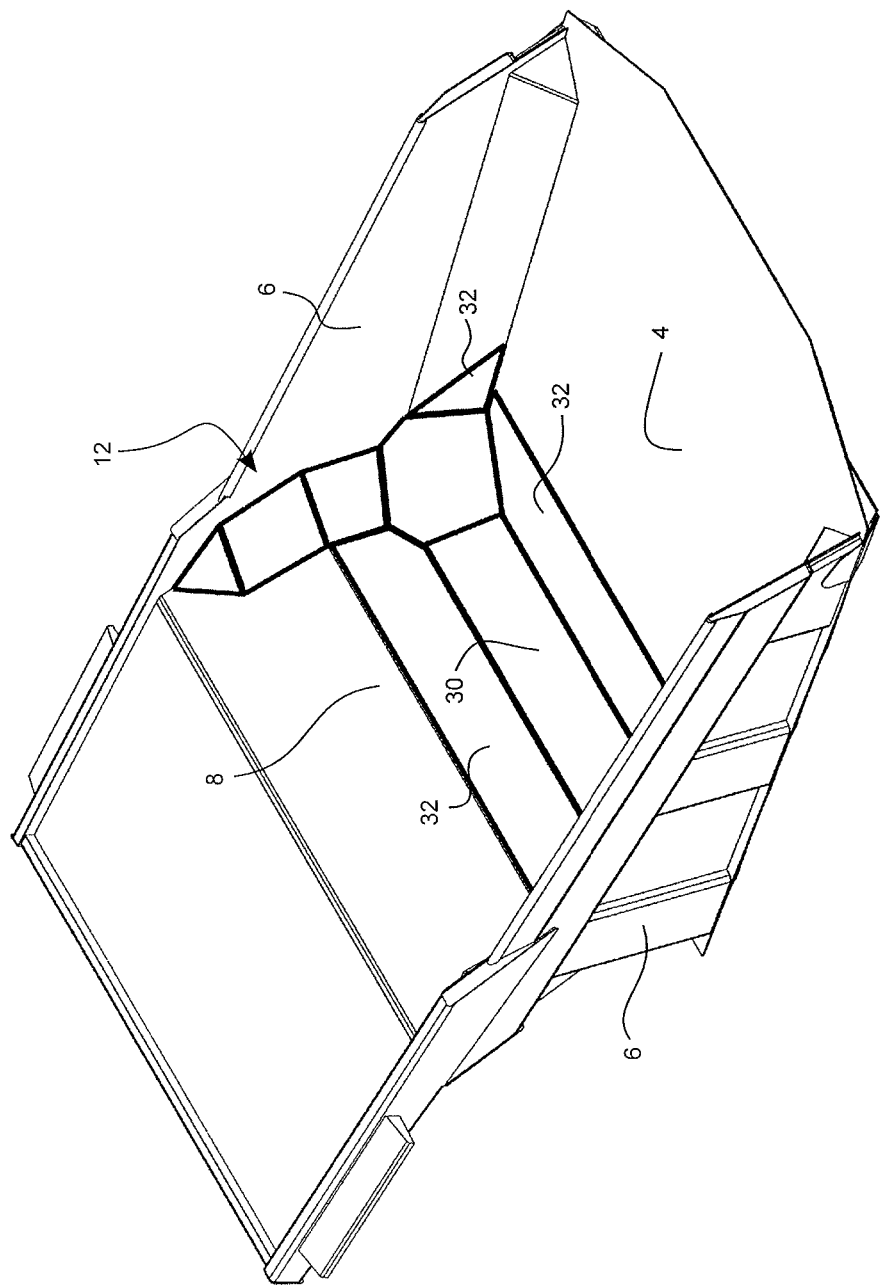
FIG. 8 shows all of the non-stick surfaces of the truck body of FIG. 7.

With the extended non-stick surfaces 32, the size of the non-stick area covers a larger section of the floor 4 and front wall 8, while still covering the vertical intersections between the sidewalls 6 and front wall 8 and the intersection between the front wall 8 and floor 4, as shown by the dark outlined sections of FIG. 8. If needed, the size of the non-stick area can be increased even further, as desired.

While, certain materials and environments may justify a large non-stick area, there are several reasons that covering the entire interior of the truck body with a non-stick surface might be considered disadvantageous. First, the manufacture of appropriate hydrophobic or oleophobic surfaces is currently fairly expensive, and thus, limiting the use of these surfaces to areas where they are particularly advantageous is desirable. Non-stick surfaces are preferably used wherever the material has a tendency to stick to the truck body 2 as described above, and a remainder of the truck body interior is free of a non-stick material. In particular, it may be advantageous for the truck body floor 4 and sidewalls 6 to be free of non-stick material toward the rear of the truck body near the opening. It is conceivable that the entire interior of the truck body could be covered with a non-stick surface.

Figure 9:
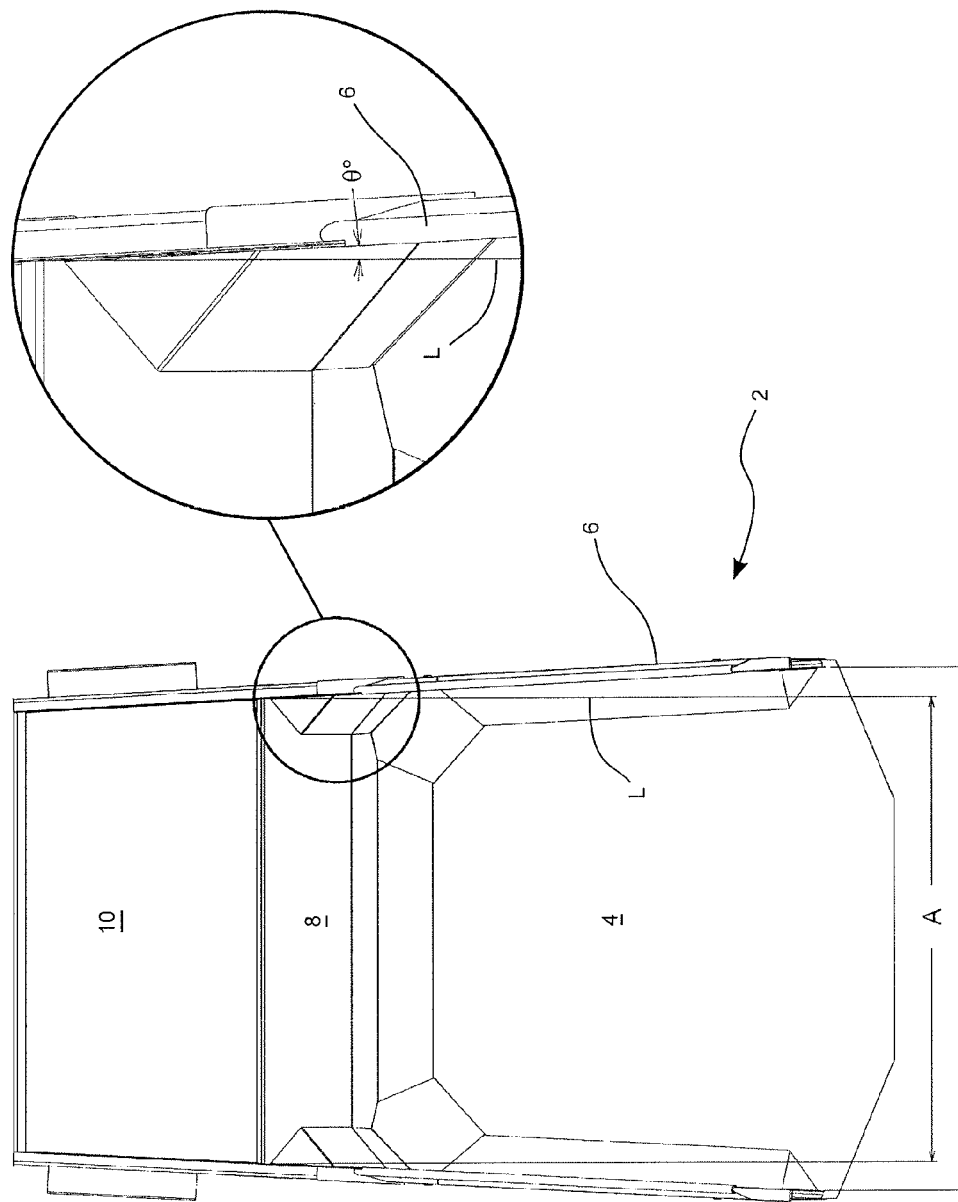
FIG. 9 is a top view of any of the truck bodies of FIGS. 1, 5 and 7 and illustrates a taper of the truck body side walls.

A further aid to dispensing the load from the truck body 2 and promoting the breaking up of the load is illustrated in the top view of the truck body shown in FIG. 9. As is evident from this drawing, the sidewalls 6 of the truck body taper outwardly at an extreme rate. If the structural components of the sidewalls 6 extend to form portions of the canopy 10, it is possible that the canopy 10 will also taper at a similar rate to the sidewalls, as illustrated in FIG. 9.

The tapering of the truck body sidewalls 6 results in a width of the truck body 2 at the open rear end having a distance A' that is considerably larger than the width A of the truck body 2 at the truck body front wall 8. In one embodiment, the width A' at the rear of the truck body is between 10 and 20% greater than the width A at the front of the truck body. As an example, the increase in width from the front to the back of the truck body could be about 12%. The length of the truck body 2 is indicated by two different measurements in FIG. 9. The length C is measured from the back edge of the floor 4 to the junction between the front wall 8 and the canopy 10 of the truck body 2. The length C' is measured from the back edge of the floor 4 to the junction between the floor and either the non-stick surface 30 or the front wall 8, if the body does not include the non-stick surface. To give an example of the size of the bodies exemplified by the truck body 2 in FIG. 9, the typical length C is about 25-40 feet. The ratio C/A is approximately between 1.25 to 1.5. The ratio C'/A is approximately between 0.85 to 1.15.

The extreme outward tapering of the truck body provides several advantages while dumping the load that is being hauled. As the bulk of the load moves toward the opening at the truck body rear, the sidewalls 6 will recede relative to the load, which reduces the tendency of the load to stick to the sidewalls 6. The receding of the sidewalls 6, relative to the load as it moves toward the opening, also effectively removes the supporting surface provided by the sidewalls on the load. Thus, if the load is formed by a very cohesive material, such as oil sands, which has compacted into a single mass, or loaf, the removal of the supporting side walls will aid in breaking down the loaf. Without the presence of the sidewalls supporting and holding up the sides of the loaf, sections of the material load will have a tendency to break off from the bulk of the load. This initial breaking at the sides of the load loaf can cause a type of chain reaction, where the removal of support on the outer sides of the loaf causes the sides to break down, which removes support from an adjacent layer of material within the loaf, thereby causing it to break, and so on.

Figure 10:
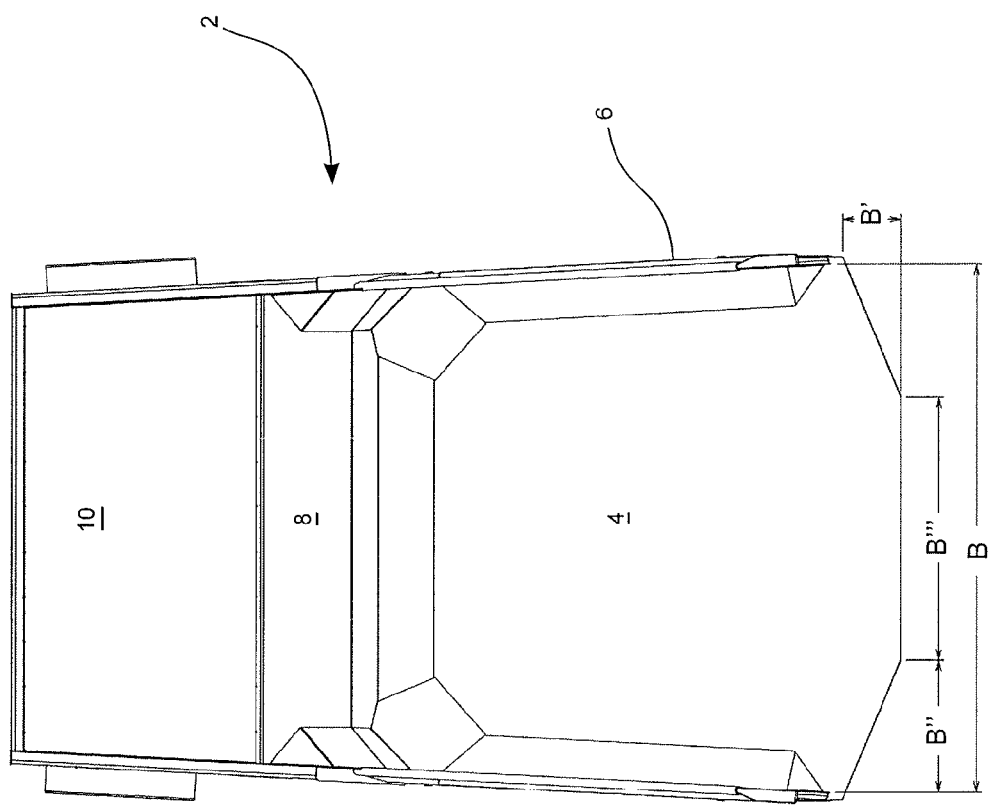
FIG. 10 is a top view of any of the truck bodies of FIGS. 1, 5 and 7 and illustrates a shortened length at the sides of the body floor compared to the center of the body floor.

The breaking down of the load can also be promoted by a variation in the length of the body floor 4 across the width of the truck body 2. In FIG. 10 the sides of the body floor 4 are raked back at an angle with respect to a central portion of the floor, thereby shortening the length of the sides of the truck body floor 4. Shortening the sides of the truck body floor provides two break points, one on each side of the truck body, which causes the load to break down as the load is dumped. With the truck body raised to dump the load, the hauled material reaches the edge of the truck body at the sides of the load earlier than at the center of the load. Accordingly, with the support beneath the sides of the load removed, the sides of the load break away from the center. This breaking down of the load at the floor sides further promotes a complete breaking down of the load as it is dumped, preventing the load from being dispensed from the truck body in a solid (mass) loaf.

The particular geometry used for the raked sections of the truck body floor can be determined based on any of several characteristics. First, the sides of the body floor should preferably not be shortened so far that the load capacity of the truck is affected. On the other hand, there is also a limit to which the central portion of the truck body floor can be extended, for example, based on the necessity for adequate ground clearance below the rear edge of the truck body floor when the front end is raised. In an advantageous embodiment, the width of the raked back sections can collectively amount to approximately half of the width of the rear end of the truck body floor. For example, in FIG. 10, the combined width of the two raked back sections B" could be 45 to 60% of the total width B of the rear of the body floor, with a remainder of the width forming the central floor portion B'". In a specific example, the raked back sections combine to make up 50% of the truck body floor. Further, the overall variation in the length of the floor can be designed such that the central portion of the truck body floor extends a length B' past the floor side that is, for example, 10 to 15% of the rear width of the truck body floor. In a specific example, the central portion of the truck body floor extends further than the sides of the truck body floor by an amount of 11% of the width of the truck body floor.

Figure 11:
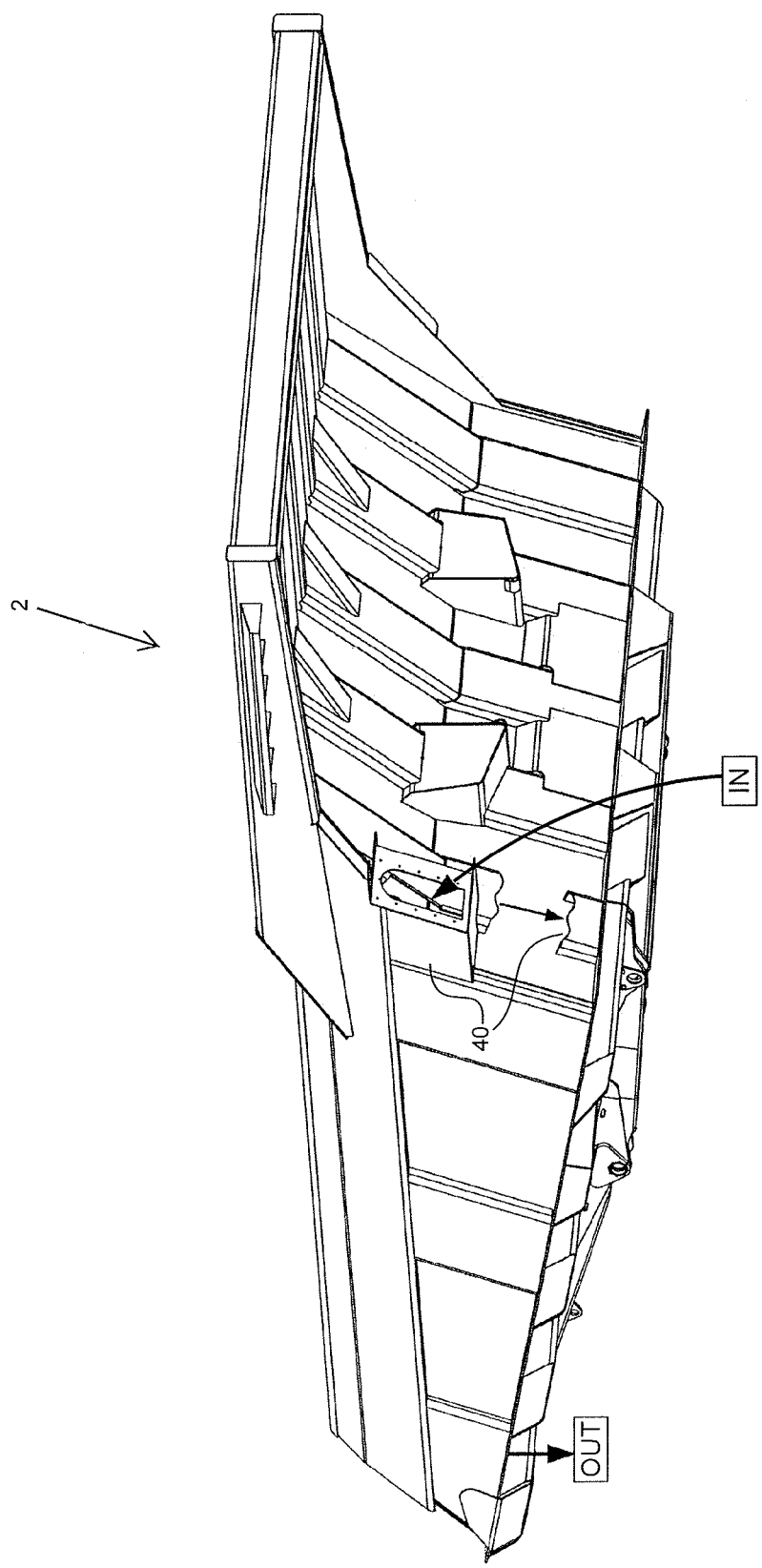
FIG. 11 illustrates an inlet and outlet of an exhaust manifold extending through a truck body.
Figure 12:
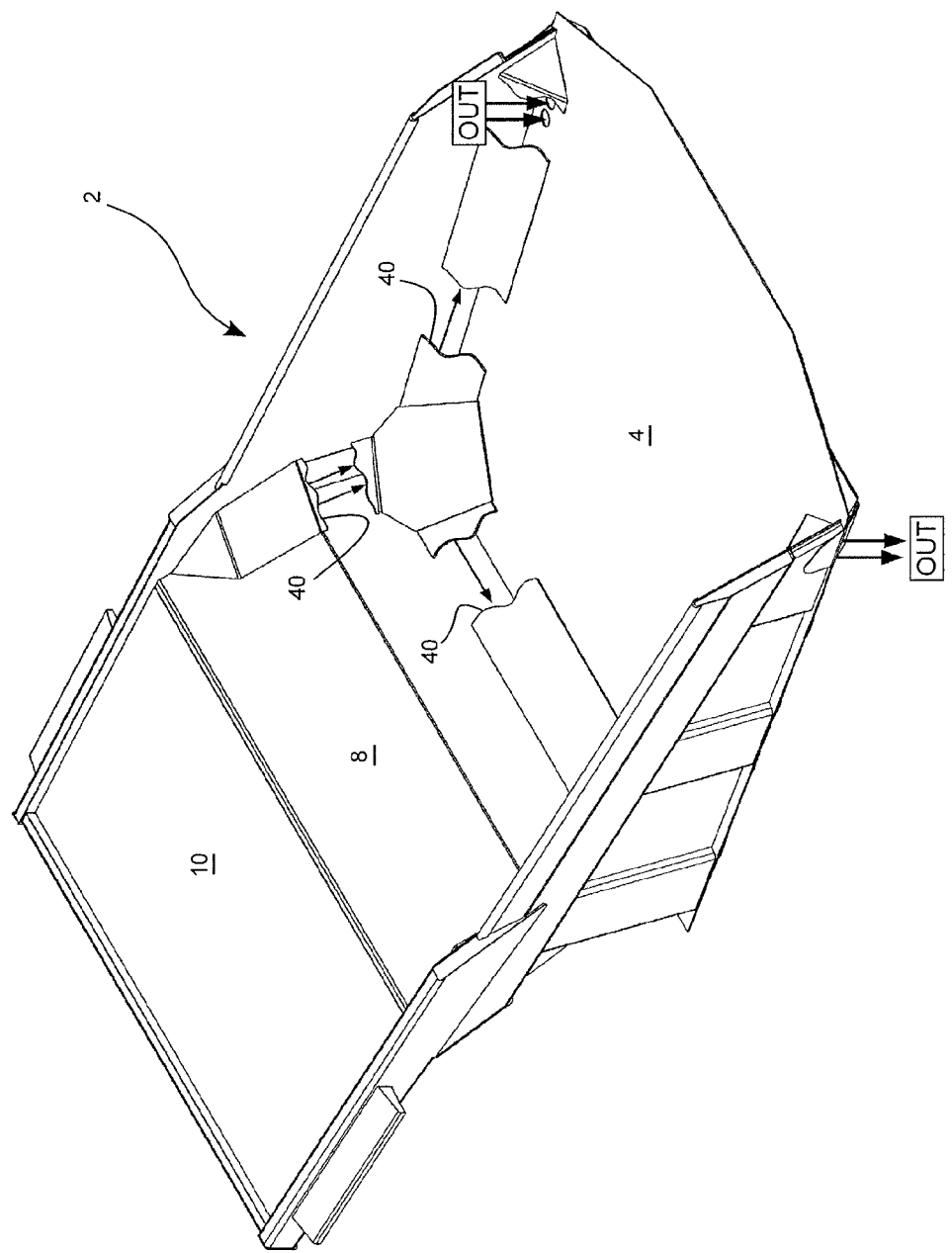
FIG. 12 is an isometric view showing a path of the exhaust manifold of FIG. 11 for warming the non-stick surfaces.
Figure 13:
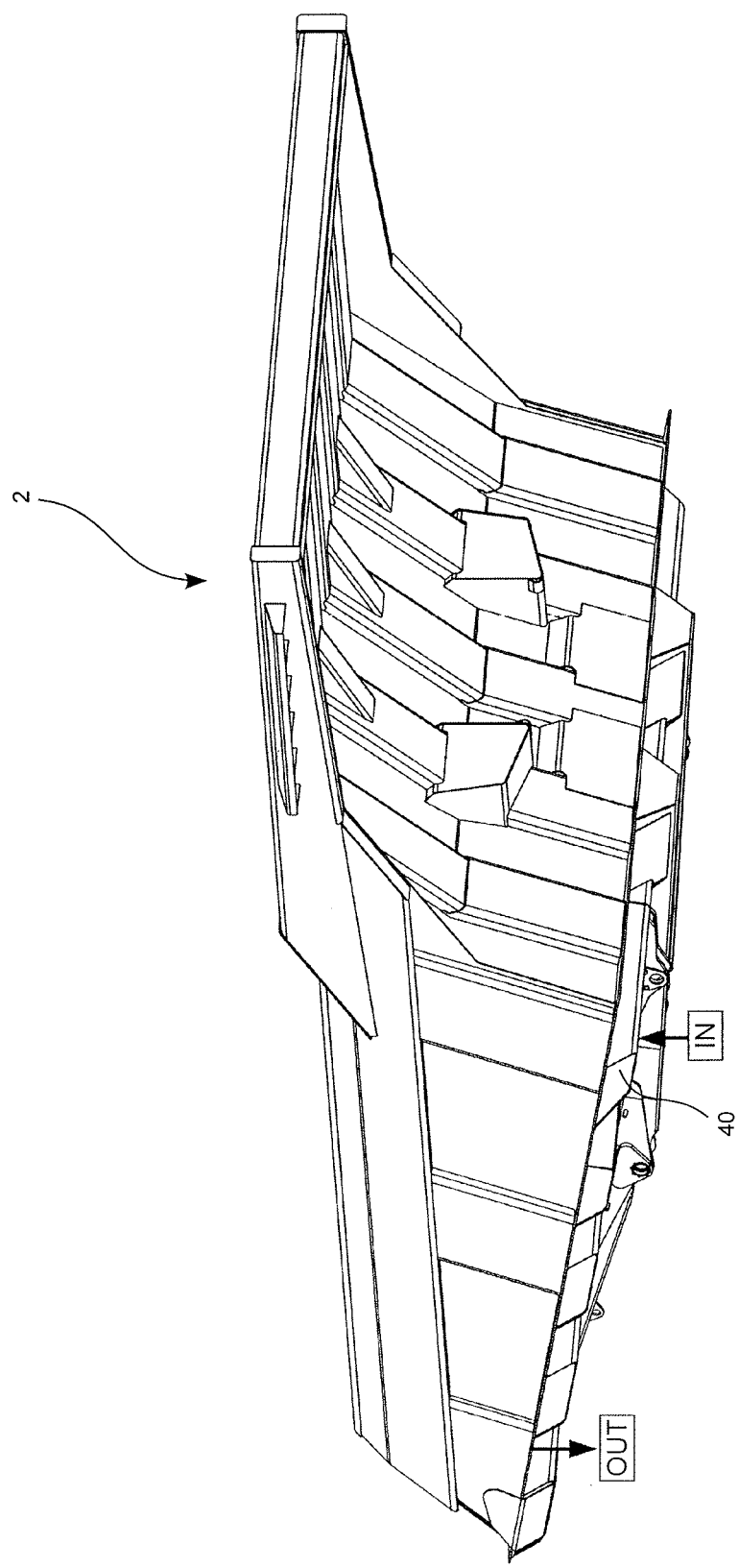
FIG. 13 illustrates another inlet and outlet of an exhaust manifold extending through a truck body.
Figure 14:
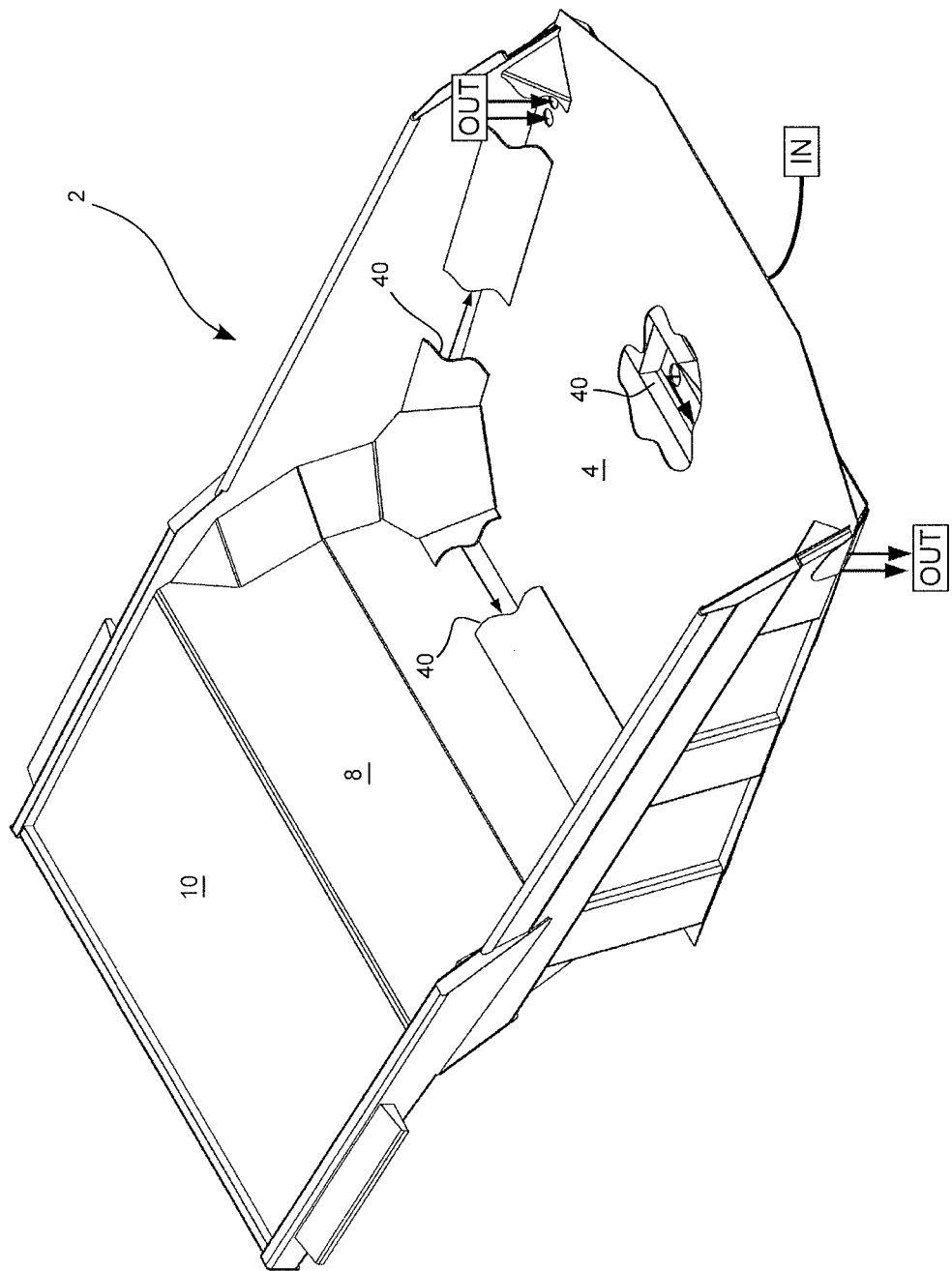
FIG. 14 is an isometric view showing a path of the exhaust manifold of FIG. 13 for warming the non-stick surfaces.

The configuration of some off-highway trucks allows for engine exhaust gases to flow thru the truck body (a muffler) while on some off-highway trucks engine exhaust gases are ported directly to atmosphere. The current embodiment illustrates engine exhaust gases being ducted into the truck body, FIGS. 11-14 illustrate two embodiments of truck body exhaust manifolds that can be used to further assist dispensing of the contents of the truck body. If the materials being hauled are particularly cohesive, or the environment the truck is being used in is particularly cold, it can be advantageous to warm portions of the truck body, particularly the non-stick surfaces, to help prevent material load adhesion to the truck body interior. This can be achieved relatively easily, without expending any energy resources, by using the exhaust of the truck engine to warm parts of the truck body. However, different truck chassis provide the exhaust in different locations. Accordingly, as shown in FIGS. 11 and 13, the truck body can include different embodiments of manifolds configured to receive the exhaust based on the particular truck being used. From the engine exhaust entrance point into the truck body, the exhaust can travel through the truck body manifold to areas in a vicinity of the non-stick surfaces 12. Thus, as shown in FIGS. 12 and 14, the truck body manifold can include the space between the non-stick surfaces and the respective intersections which they cover.

While the use of heat provided by the engine exhaust to warm the non-stick surfaces can be advantageous, the design of the exhaust manifold through the truck body should be carefully considered. In particular, if the truck body is going to be used in cold environments, it should be ensured that the exhaust manifold is short enough that the exhaust does not cool down within the manifold to the point where it may condense on the manifold surfaces. The condensation of exhaust gases can lead to observed problems where the sulfur dioxide within the exhaust gases combines with exhaust gas moisture to form sulfuric acid. Once the sulfuric acid pools within the truck body manifold, it can attack the metal surfaces of the truck body and comprise the truck body structural integrity. Therefore, it is advantageous if the path of the truck body manifold is limited to only areas of particular advantage. For instance, in the embodiment of FIGS. 11 and 12, the manifold path is limited to the areas of intersection of the truck body components, and the manifold 40 is kept away from the truck body floor structural components on the underside of the body floor. Similarly, in the embodiment of FIGS. 13 and 14, the exhaust gases are directed by the truck body manifold 40 from the point of entry into the truck body immediately to the body sidewall, where they can travel along the intersections of the body floor with the sidewalls and front. Preferably, the routing of the exhaust gas is above the floor plane. Or it is very limited in its routing below the floor plane such as shown in FIGS. 13 and 14.

In the illustrated embodiments, the plates that form the non-stick surfaces form the outer wall of the manifold 40, such that the exhaust gas is in direct contact with the structure forming the non-stick surfaces. However, it is not necessary for the truck body exhaust manifold to have such direct contact with the non-stick surfaces. Instead, the manifold 40 could be disposed merely in the vicinity of the non-stick surfaces, which would be advantageous, and the exhaust gas is able to warm the non-stick surfaces. Though it is not absolutely necessary that the exhaust gases are in contact with the non-stick surfaces. FIG. 15 shows the truck body in a position of use mounted onto an off-highway truck 50, which includes a cab 52, a frame 54 and tires and wheels 56. The truck body 2 is mounted to the frame for rotation about a pivot point 58.

While the invention has been particularly shown and described with reference to preferred embodiments thereof, it will be understood by those skilled in the art that various changes in form and details may be made therein without departing from the spirit and scope of the invention.

The invention claimed is:

1. A truck body for hauling oil sands that amalgamates into a substantially single mass when hauled, the truck body comprising:
    a body floor for supporting a load of the oil sands and adapted for unevenly removing support of the load of oil sands at a non-linear edge of the floor during dumping of the load of oil sands, thereby acting to break up the single mass;
    a body front wall for forwardly confining the load of the oil sands;
    two body sidewalls for laterally confining the load of the oil sands and adapted to remove lateral confinement of the load of the oil sands during its dumping, thereby breaking up the single mass; and
    at least one non-stick surface bridging an intersection between the body floor and the body front wall or one of the body sidewalls, thereby covering the entirety of the intersection.

2. A truck body for hauling material that amalgamates into a substantially single mass when hauled, the truck body comprising:
    a body floor for supporting a load of the material and having an edge over which the material falls when the body is moved into a dumping position;
    a body front wall for forwardly confining the load of the material;
    two body sidewalls for laterally confining the load of the material;
    means for removing lateral confinement of the load of the material during its dumping, thereby breaking up the single mass; and
    means for unevenly removing support of the load of material by the body floor at the edge of the floor during dumping of the load of the material, thereby further breaking up the single mass; and
    at least one non-stick surface bridging an intersection between the body floor and the body front wall or one of the body sidewalls, thereby covering the entirety of the intersection.

3. The truck body of claim 1, wherein the non-stick surface is hydrophobic.

4. The truck body of claim 1, further comprising an exhaust manifold disposed in a vicinity of the non-stick surface, the exhaust manifold being configured to warm the non-stick surface with heat from engine exhaust gas during operation of a truck on which the truck body is mounted.

5. The truck body of claim 1, wherein the non-linear edge of the floor extends beyond the sidewalls most at an area proximate a center of the floor and least at an area proximate of the sidewalls.

6. The truck body of claim 1, wherein a width of the rear of the truck body is up to 15% larger than a width of the front of the truck body.

7. The truck body of claim 1, wherein sides of the truck body floor are shortened such that a central portion of the truck body floor is longer than the sides of the truck body floor.

8. The truck body of claim 1, wherein the non-linear edge of the floor results from a length of the truck body floor varying across a width of the truck body.

9. The truck body of claim 8, wherein sides of the truck body floor are shortened such that a central portion of the truck body floor is longer than the sides of the truck body floor.

10. The truck body of claim 9, wherein a width of the shortened sides of the truck body floor make up 45% to 60% of the overall width of the truck body floor.

11. The truck body of claim 2, wherein the means for unevenly removing floor support of the load is a non-linear edge at a rear of the truck body floor.

12. The truck body of claim 9, further comprising an exhaust manifold disposed in a vicinity of the at least one non-stick surface and configured to warm the at least one non-stick surface with heat from engine exhaust gas during operation of a truck on which the truck body is mounted.

13. The truck body of claim 2, wherein the means for removing lateral confinement of the load is a tapering of the sidewalls outwardly from front to rear of the body.

* * * * *